US009638833B2

(12) United States Patent
Childers (10) Patent No.: US 9,638,833 B2
(45) Date of Patent: May 2, 2017

(54) MULTIPLE LIGHT COLLECTION AND LENS COMBINATIONS WITH CO-LOCATED FOCI FOR CURING OPTICAL FIBERS (71) Applicant: Phoseon Technology, Inc., Hillsboro, OR (US)

(72) Inventor: Doug Childers, Portland, OR (US)

(73) Assignee: Phoseon Technology, Inc., Hillsboro, OR (US)

(*) Notice: Subject to any disclaimer, the term of this patent is extended or adjusted under 35 U.S.C. 154(b) by 0 days.

(21) Appl. No.: 15/063,723

(22) Filed: Mar. 8, 2016

(65) Prior Publication Data
US 2016/0187542 A1 Jun. 30, 2016

Related U.S. Application Data (63) Continuation of application No. 13/648,447, filed on Oct. 10, 2012, now Pat. No. 9,304,273.
(Continued)

(51) Int. Cl.
*G02B 1/12* (2006.01)
*G02B 6/44* (2006.01)
(Continued)

(52) U.S. Cl.
CPC .................. *G02B 1/12* (2013.01); *B05C 9/12* (2013.01); *F21K 9/60* (2016.08); *G02B 5/0891* (2013.01);
(Continued)

(58) Field of Classification Search
CPC .............. F26B 13/00; G21K 2201/064; G21K 2201/065; G21K 5/00; G02B 19/0066; G02B 3/06; G02B 3/08
(Continued)

(56) References Cited

U.S. PATENT DOCUMENTS 5,857,767 A  1/1999 Hochstein
6,200,134 B1  3/2001 Kovac et al.
(Continued)

FOREIGN PATENT DOCUMENTS

AU  9225821 B  4/1993
DE  19619154 A1  6/1997
(Continued)

OTHER PUBLICATIONS

Data Sheet for G*SiC Technology Super Blue LEDs No. C430-CB290-E1200, Manufactured by Opto Semiconductors, May 1, 1999, 8 pages.
(Continued)

*Primary Examiner* — Michael Maskell
(74) *Attorney, Agent, or Firm* — McCoy Russell LLP (57) ABSTRACT

A device for UV curing a coating or printed ink on a workpiece such as an optical fiber comprises at least two UV light sources equally spaced around a central axis, each UV light source comprising a reflector and a cylindrical lens, and the UV curing device configured to receive a workpiece along the central axis. The reflectors are configured to substantially reduce the emitting angle of light from the UV light sources, thereby directing the light substantially through the cylindrical lenses, the cylindrical lenses focusing the light intensely along a surface of the workpiece.

17 Claims, 7 Drawing Sheets

Related U.S. Application Data (60) Provisional application No. 61/546,407, filed on Oct. 12, 2011.

(51) Int. Cl.

| | | |
|---|---|---|
| *B05C 9/12* | (2006.01) | |
| *G02B 5/08* | (2006.01) | |
| *G02B 5/20* | (2006.01) | |
| *G02B 6/02* | (2006.01) | |
| *G02B 27/14* | (2006.01) | |
| *H05B 33/08* | (2006.01) | |
| *F21K 9/60* | (2016.01) | |

(52) U.S. Cl.
CPC .............. *G02B 5/208* (2013.01); *G02B 6/02* (2013.01); *G02B 6/44* (2013.01); *G02B 27/141* (2013.01); *H05B 33/0845* (2013.01)

(58) Field of Classification Search
USPC .................. 250/492.1–492.3, 453.11–455.11
See application file for complete search history.

(56) References Cited

U.S. PATENT DOCUMENTS

| | | | |
|---|---|---|---|
| 6,457,823 B1 | 10/2002 | Cleary et al. | |
| 6,501,084 B1 | 12/2002 | Sakai et al. | |
| 6,621,087 B1* | 9/2003 | Bisges | F21V 7/005 250/492.1 |
| 6,626,561 B2 | 9/2003 | Carter et al. | |
| 6,692,250 B1 | 2/2004 | Decaudin et al. | |
| 6,759,664 B2 | 7/2004 | Thompson et al. | |
| 6,880,954 B2* | 4/2005 | Ollett | A61C 19/004 362/245 |
| 8,314,408 B2* | 11/2012 | Hartsuiker | C03C 25/12 250/491.1 |
| 2001/0046652 A1 | 11/2001 | Ostler et al. | |
| 2002/0187454 A1 | 12/2002 | Melikechi et al. | |
| 2003/0026919 A1* | 2/2003 | Kojima | C03C 25/12 427/558 |
| 2003/0043582 A1 | 3/2003 | Chan et al. | |
| 2003/0081096 A1 | 5/2003 | Young | |
| 2003/0227527 A1 | 12/2003 | Richards | |
| 2006/0274529 A1 | 12/2006 | Cao | |
| 2007/0206390 A1* | 9/2007 | Brukilacchio | G02B 6/4298 362/555 |
| 2007/0275344 A1* | 11/2007 | Liu | A61C 19/004 433/29 |
| 2008/0067425 A1* | 3/2008 | Kaszuba | B82Y 10/00 250/492.2 |
| 2010/0032585 A1 | 2/2010 | Caiger et al. | |
| 2010/0183821 A1* | 7/2010 | Hartsuiker | C03C 25/12 427/513 |
| 2011/0049392 A1* | 3/2011 | Martinez | H01L 33/648 250/492.1 |
| 2011/0147356 A1* | 6/2011 | Leonhardt | B05D 3/067 219/201 |
| 2011/0204261 A1* | 8/2011 | Dahm | F21V 29/30 250/492.1 |
| 2012/0040105 A1* | 2/2012 | Overton | C03C 25/12 427/558 |

FOREIGN PATENT DOCUMENTS

| | | |
|---|---|---|
| DE | 10127171 A1 | 12/2001 |
| EP | 0879582 A2 | 11/1998 |
| EP | 1158761 A1 | 11/2001 |
| JP | 2008102389 A | 5/2008 |
| JP | 2010117531 A | 5/2010 |
| KR | 200358745 Y1 | 8/2004 |
| WO | 9507731 A1 | 3/1995 |
| WO | 0059671 A1 | 10/2000 |
| WO | 0067048 A2 | 11/2000 |
| WO | 0211640 A2 | 2/2002 |
| WO | 0213231 A2 | 2/2002 |
| WO | 03023875 A2 | 3/2003 |
| WO | 2011079108 A1 | 6/2011 |

OTHER PUBLICATIONS

Data Sheet for 3.0 mm Blue Series LEDs No. LNG997CKB, Manufactured by the Panasonic Corporation, Mar. 2001, 1 page.
Data Sheet for 5.0 mm Blue Series LEDs No. LNG992CFB, Manufactured by the Panasonic Corporation, Mar. 2001, 1 page.
Data Sheet for G*SiC Technology Ultraviolet LEDs No. C395-MB290-E400, Manufactured by Cree, Inc., Available as Early as Jul. 2001, 2 pages.
ISA Korean Intellectual Property Office, International Search Report and Written Opinion Issued in Application No. PCT/US2012/059516, Mar. 13, 2013, WIPO, 10 pages.
European Patent Office, Extended European Search Report Issued in Application No. 12840225.2, Jan. 23, 2015, 6 pages.

\* cited by examiner

MULTIPLE LIGHT COLLECTION AND LENS COMBINATIONS WITH CO-LOCATED FOCI FOR CURING OPTICAL FIBERS

CROSS REFERENCE TO RELATED APPLICATIONS

The present application is a continuation of U.S. Non-Provisional patent application Ser. No. 13/648,447, entitled MULTIPLE LIGHT COLLECTION AND LENS COMBINATIONS WITH CO-LOCATED FOCI FOR CURING OPTICAL FIBERS, and filed on Oct. 10, 2012, which claims priority to U.S. Provisional Patent Application No. 61/546,407, entitled MULTIPLE LIGHT COLLECTION AND LENS COMBINATIONS WITH CO-LOCATED FOCI FOR CURING OPTICAL FIBERS, and filed on Oct. 12, 2011, the entire contents of each of which are hereby incorporated by reference for all purposes.

BACKGROUND AND SUMMARY

Optical fibers are used ubiquitously in lighting and imaging applications, as well as in the telecommunication industry, where they provide higher data transmission rates over longer distances as compared to electric wiring. In addition, optical fibers are more flexible, lighter, and can be drawn into thinner diameters than metal wiring, allowing for higher-capacity bundling of fibers into cables. Surface coatings, applied via an ultra-violet (UV) curing process, are employed to protect optical fibers from physical damage and moisture intrusion, and to maintain their long-term durability in performance.

Carter et al. (U.S. Pat. No. 6,626,561) addresses UV curing uniformity issues for optical fibers having surfaces that are located outside a focal point of a UV curing device employing an elliptical reflector to direct UV light from a single UV light source positioned at a second focal point of the elliptical reflector, to the surface of the optical fiber. Curing uniformity issues can arise due to imprecise alignment of the optical fiber relative to the light source, or an irregular-shaped optical fiber. To address these issues, Carter uses a UV lamp structure employing an elliptical reflector to irradiate optical fiber surfaces positioned in the vicinity of a second elliptical reflector focal point with UV light from a single light source positioned in the vicinity of a first elliptical reflector focal point, wherein both the optical fiber and bulb are displaced slightly from the focal points. In this manner, the UV light rays reaching the surface of the optical fiber are dispersed, and the irradiation and curing of the optical coating can potentially be more uniform.

The inventor herein has recognized a potential issue with the above approach. Namely, by displacing the UV light source and the optical fiber away from the focal points of the elliptical reflector, the intensity of UV light irradiating the optical fiber surfaces is dispersed and reduced, thereby lowering the curing and production rates, and imparting higher manufacturing costs.

One approach that addresses the aforementioned issues includes a UV curing device, comprising one or more LED array light sources including shaped compound parabolic reflectors arranged to be equally spaced around a workpiece, wherein the compound parabolic reflectors are configured to reduce the emitting angle of the light such that a cylindrical lens can focus the light intensely to the workpiece. Each of the one or more LED array light sources comprising a compound parabolic reflector and cylindrical lens may be aligned to have an output focal position near or along a central axis of the workpiece. In this manner, it is possible to irradiate optical fibers or other workpieces with UV light both uniformly and with high intensity, providing rapid and uniform cure of coatings for optical fibers and other workpieces.

It will be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
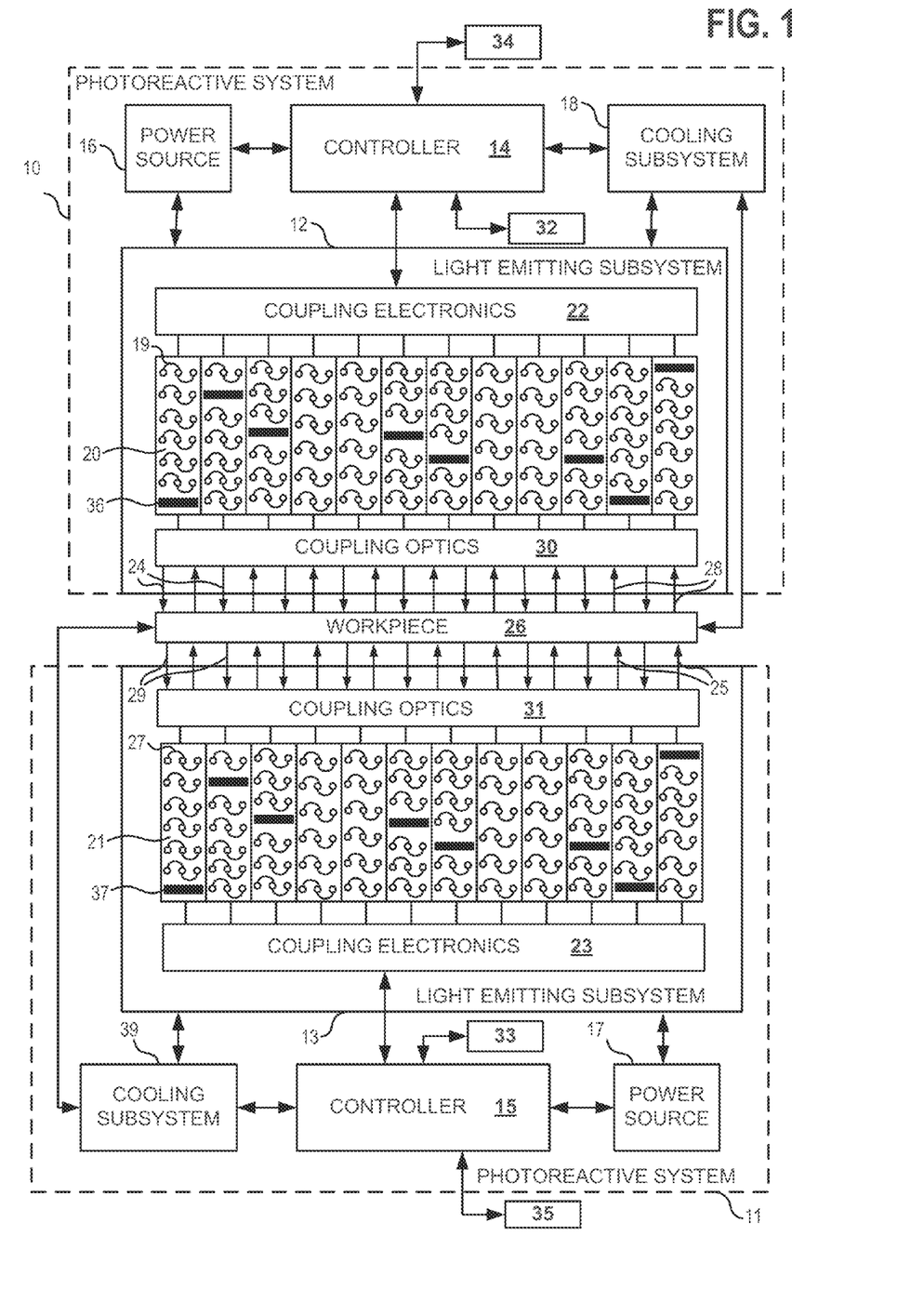
FIG. 1 illustrates an example device with two photoreactive systems, each comprising a power source, controller, cooling subsystem, and a light emitting subsystem.
Figure 2:
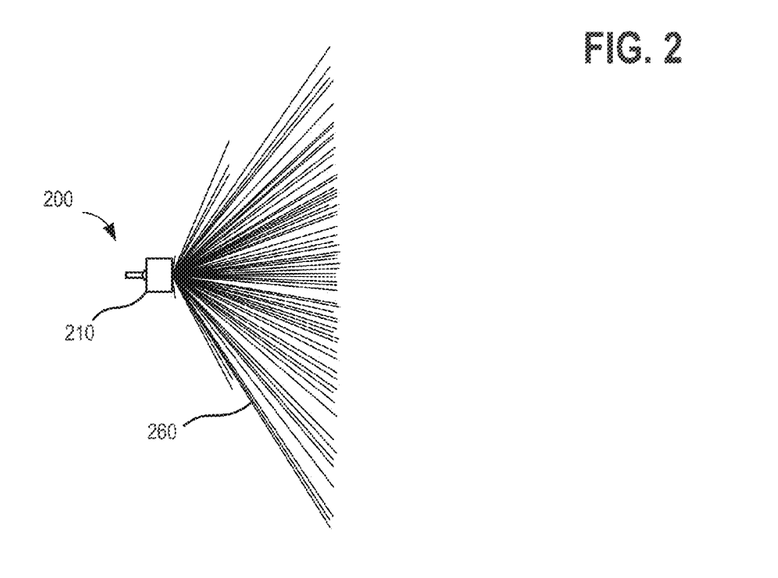
FIG. 2 is an example illustrating a cross-section of a conventional LED array that emits light in a large cone angle.
Figure 3:
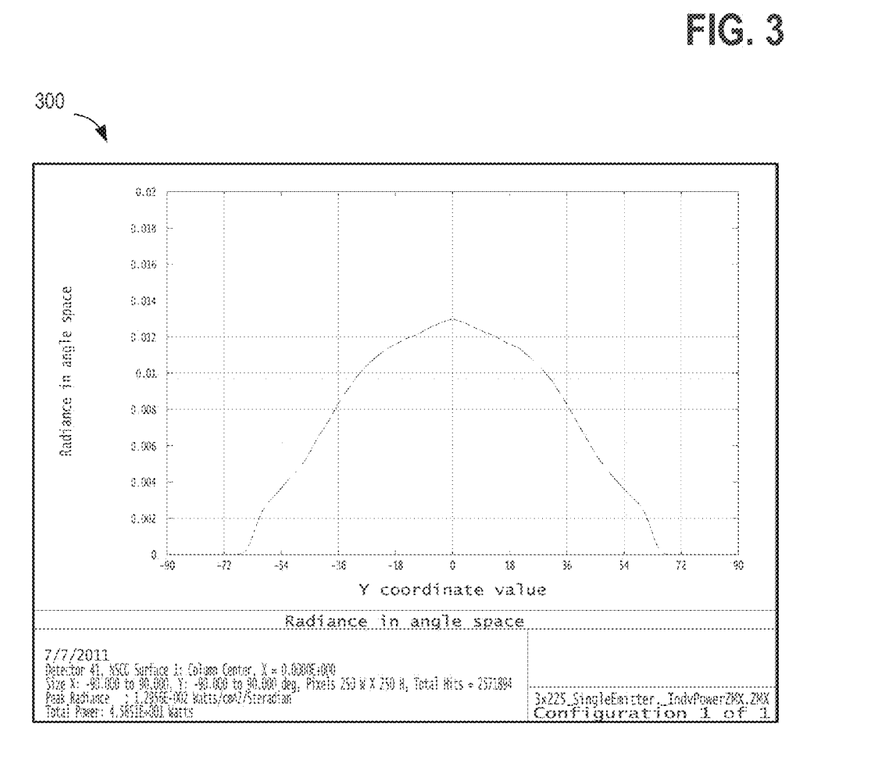
FIG. 3 is an example plot illustrating large cone angle nearing Lambertian emission from the conventional LED array of FIG. 2.
Figure 4:
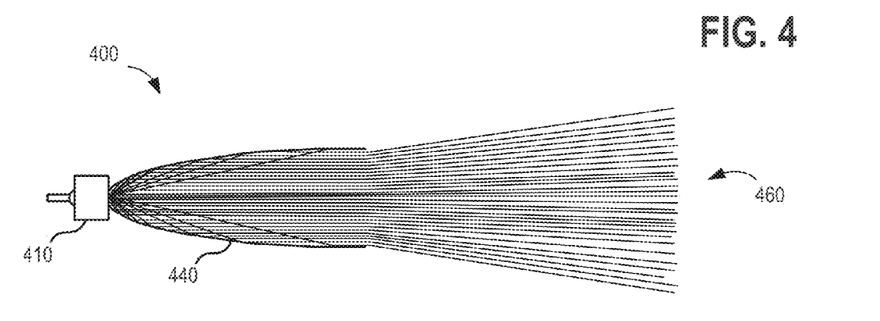
FIG. 4 is an example illustrating a cross-section of an LED array light source with a compound parabolic reflector.
Figure 5:
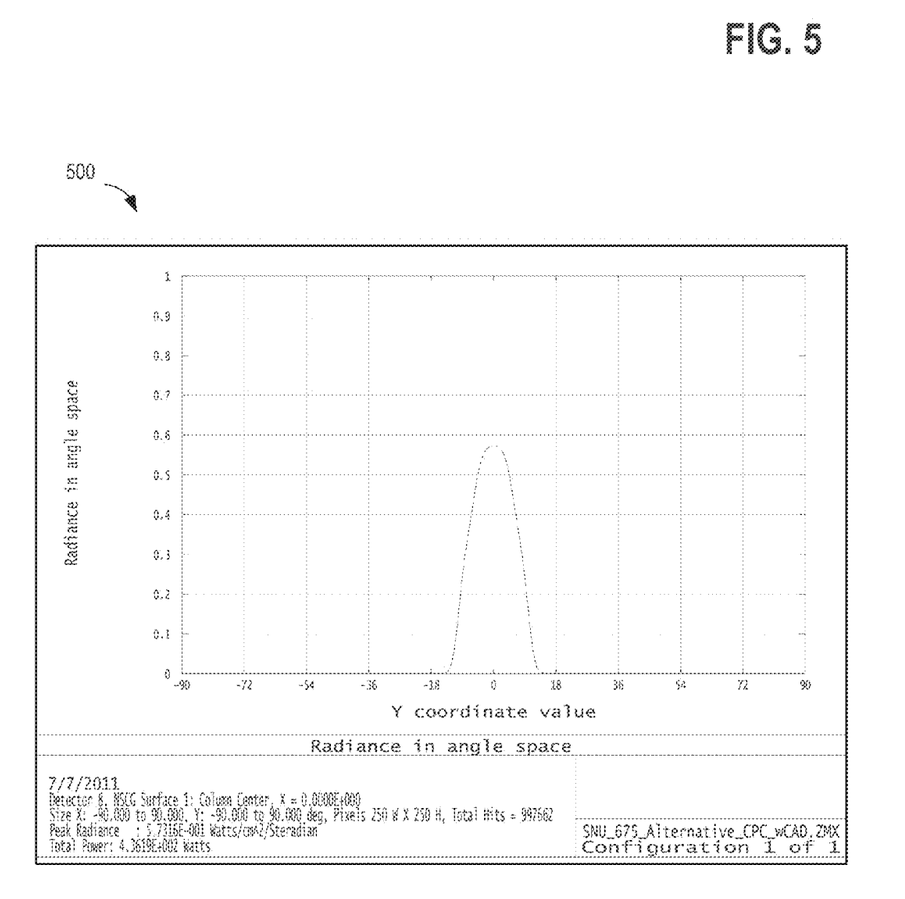
FIG. 5 is an example plot illustrating the reduced angle emission profile from the LED array light source with a compound parabolic reflector of FIG. 4.
Figure 6:
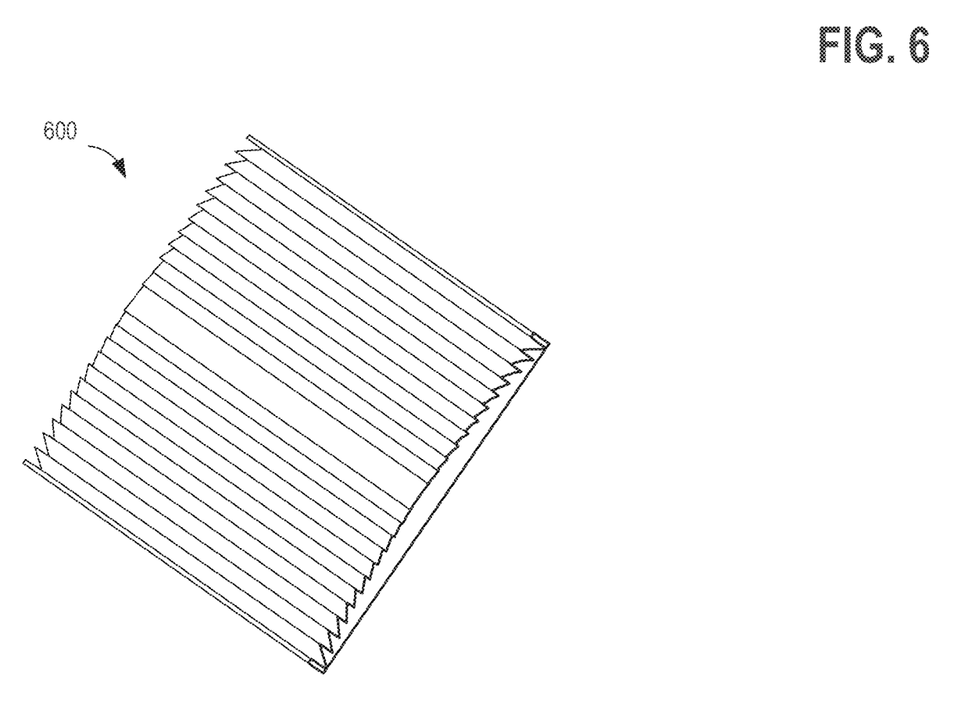
FIG. 6 is a plain view of an example cylindrical lens.
Figure 7:
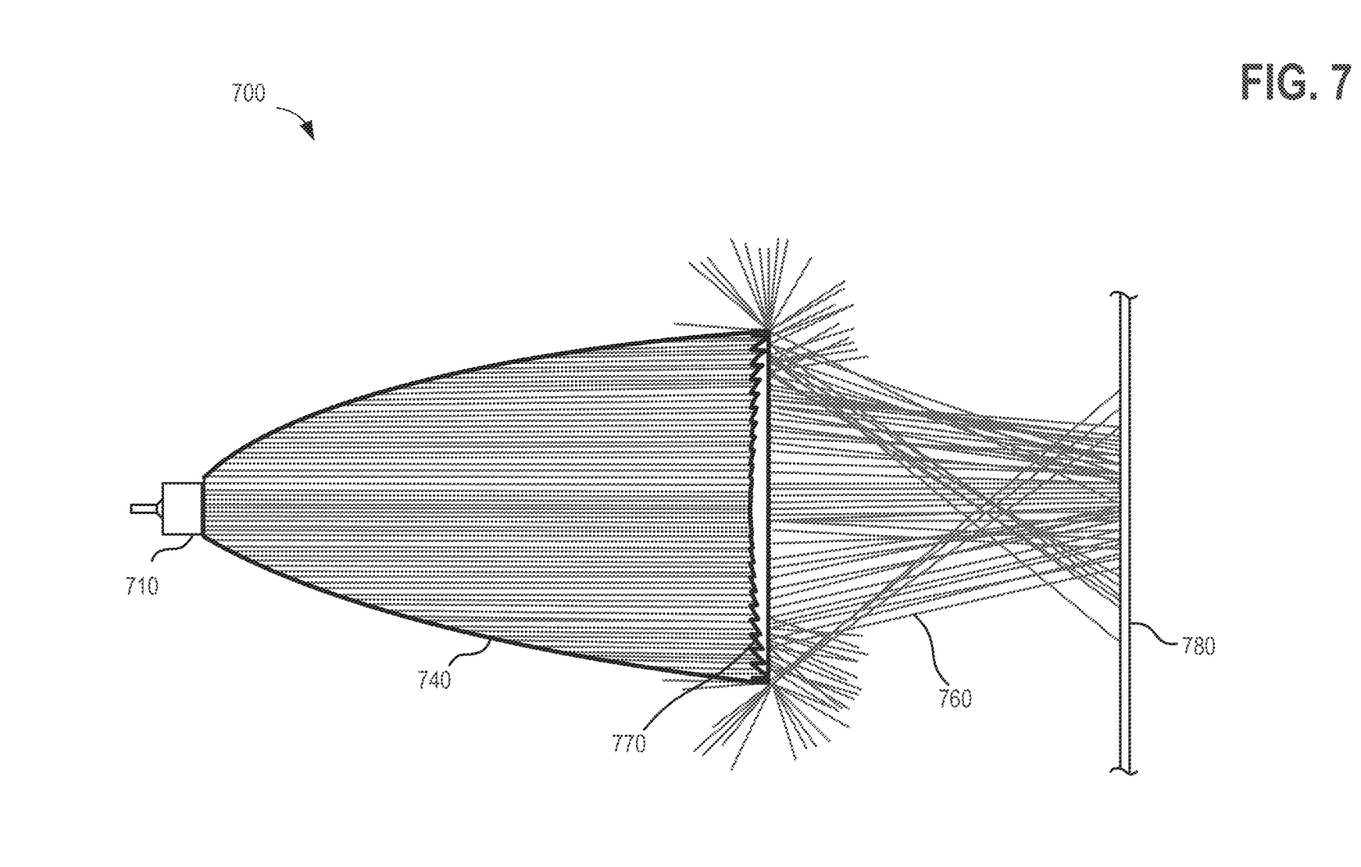
FIG. 7 is a cross-sectional view illustrating an example of a compound parabolic reflector and a cylindrical lens for focusing an LED array.
Figure 8:
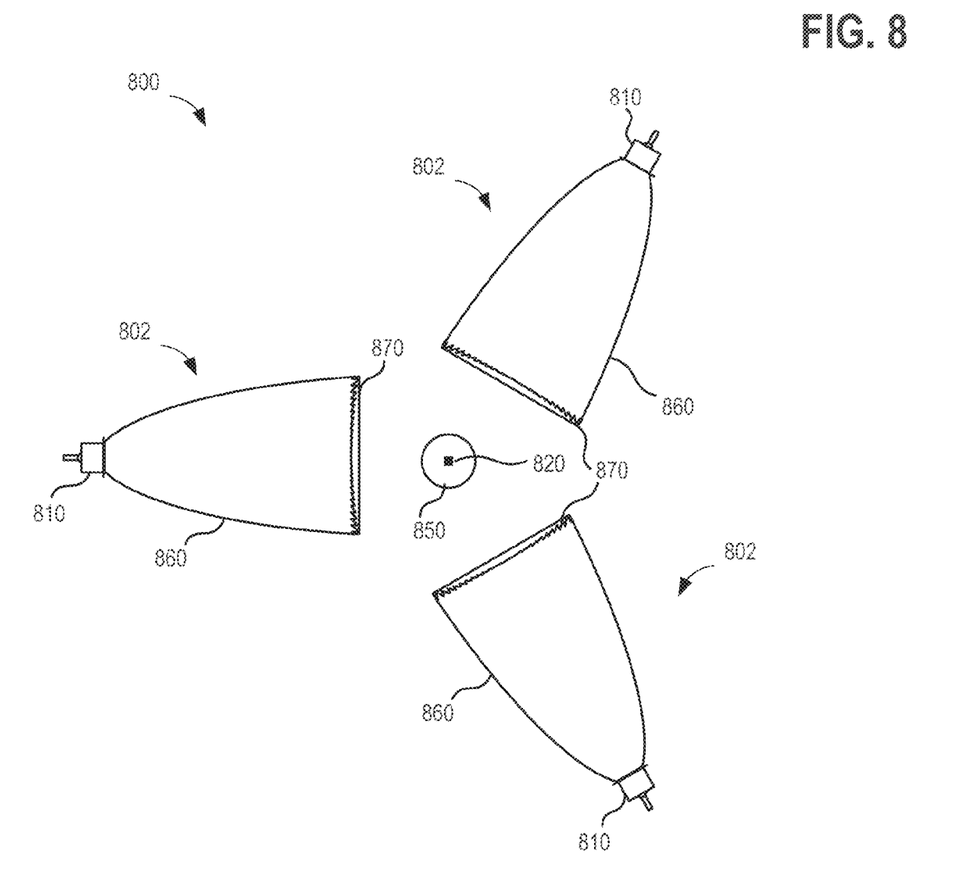
FIG. 8 is a cross-sectional view illustrating an example of multiple light sources equally spaced around a central axis for UV curing a workpiece.
Figure 9:
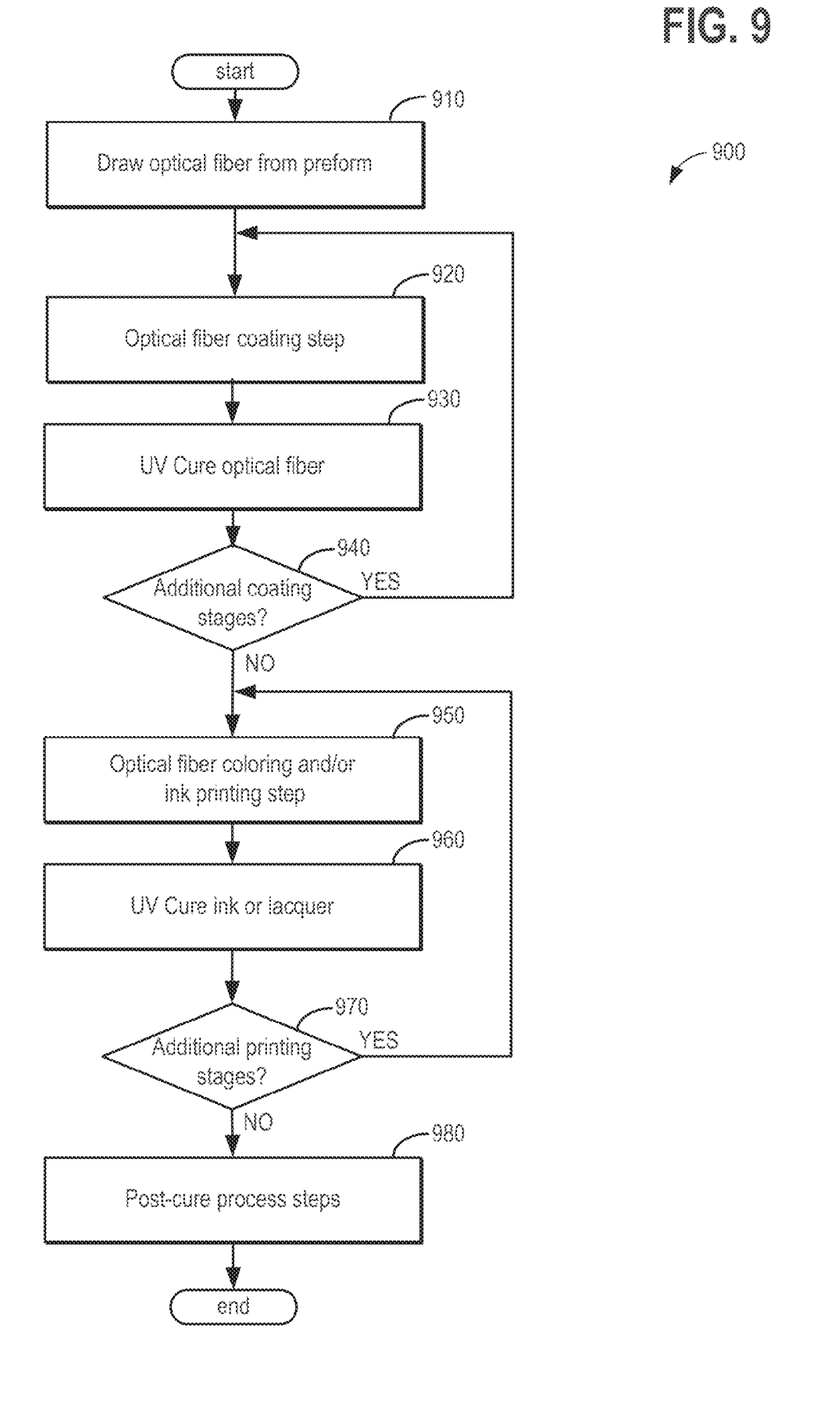
FIG. 9 illustrates a flowchart of an example method of coating a UV curable workpiece.

The present description is for a UV curing device, method and system for use in manufacturing coated optical fibers, ribbons, cables, and other workpieces. Optical fiber coatings may be UV-cured via a UV curing device employing at least two UV light sources equally spaced around the central axis of a workpiece, wherein each UV light source comprises a reflector and a cylindrical lens. FIG. 1 illustrates an example of such a UV curing device comprising two photoreactive systems, each comprising a power source, controller, cooling subsystem, and a light emitting subsystem. FIG. 2 illustrates an example of a cross-section of a conventional LED array that emits light in a large cone angle. FIG. 3 is a plot illustrating the radiance spectra emitted from a large cone angle light source (nearing Lambertion emission) such as the conventional LED array illustrated in FIG. 2. FIG. 4 illustrates a cross-section of an example of an LED array light source with a compound parabolic reflector. FIG. 5 is a plot of the reduced angle emission profile from the LED array light source with a compound parabolic reflector of FIG. 4. FIG. 6 depicts an example of a plan view of a cylindrical lens. FIG. 7 illustrates a cross sectional view of an example of a compound parabolic reflector and a cylindrical lens for focusing an LED array. FIG. 8 illustrates an example cross-section of a configuration of multiple UV light sources equally spaced around a central axis of a workpiece. FIG. 9 illustrates a flowchart of an example method for UV curing an optical fiber or other workpiece using the example UV curing device of FIG. 8.

A UV curing device may comprise at least two photoreactive systems, including at least two UV light sources, each UV light source comprising a reflector and a cylindrical lens. Referring now to FIG. 1, it illustrates a block diagram for an example configuration comprising two photoreactive systems 10 and 11. In this example, the photoreactive systems 10 and 11 are disposed on opposing sides of, and equally spaced around a central axis of, a UV-curable workpiece 26. In a first example, the photoreactive systems can include being positioned oppositely, or at an orientation of approximately 180° relative to one another, as shown in FIG. 1. In another example, the photoreactive systems being disposed on opposing sides of a UV-curable workpiece can include being positioned at an orientation of at least 90°-270° relative to one another, or 175°-185° relative to one another. In other example configurations, the UV curing device may comprise more than two photoreactive systems. For example, the UV curing device may comprise three photoreactive systems, wherein each photoreactive system is equally spaced around the central axis of the workpiece so that each photoreactive system is positioned at an orientation of approximately 120° relative to one another around the workpiece, as shown in FIG. 8. As a further example, the UV curing device may comprise n photoreactive systems, where n is a whole number greater than one, wherein each photoreactive system is equally spaced around the central axis of the workpiece so that each photoreactive system is positioned at an orientation of approximately (360/n°) relative to one another around the workpiece.

In one example, photoreactive systems 10 and 11 each comprise a light emitting subsystem 12 and 13, a controller 14 and 15, a power source 16 and 17 and a cooling subsystem 18 and 39, respectively.

The light emitting subsystems 12 and 13 may comprise a plurality of semiconductor devices 19 and 27, respectively. Semiconductor devices 19 and 27 may be LED devices, for example. Selected of the plurality of semiconductor devices 19 and 27 may be implemented to provide radiant output 24 and 25, respectively. The radiant output 24 may be directed to a workpiece 26. Returned radiation 28 and 29 may be directed back to the light emitting system 12 and 13 respectively from the workpiece 26 (e.g., via reflection of the radiant output 24 and 25).

The radiant output 24 and 25 may be substantially directed to the workpiece 26 via coupling optics 30 and 31. The coupling optics 30 and 31, if used, may be variously implemented. As an example, the coupling optics may include one or more layers, materials or other structures interposed between the semiconductor devices 19 and 27, providing radiant output 24 and 25 to surfaces of the workpiece 26. As an example, the coupling optics 30 and 31 may include a micro-lens array to enhance collection, condensing, collimation or otherwise the quality or effective quantity of the radiant output 24 and 25. As another example, the coupling optics 30 and 31 may include a micro-reflector array. In employing such a micro-reflector array, each semiconductor device providing radiant output 24 and 25 may be disposed in a respective micro-reflector, on a one-to-one basis. As another example, an array of semiconductor devices 20 and 21 or an array of arrays of semiconductor devices 20 and 21 providing radiant output 24 and 25 may be disposed in macro-reflectors, on a many-to-one basis. In this manner, coupling optics 30 may include both micro-reflector arrays, wherein each semiconductor device is disposed on a one-to-one basis in a respective micro-reflector, and macro-reflectors wherein the quantity and/or quality of the radiant output 24 and 25 from the semiconductor devices is further enhanced, as stated above, by macro-reflectors. For example, the macro-reflectors may be compound parabolic reflectors.

Each of the layers, materials or other structure of coupling optics 30 and 31 may have a selected index of refraction. By properly selecting each index of refraction, reflection at interfaces between layers, materials and other structures in the path of the radiant output 24 and 25 (and/or returned radiation 28, 29) may be selectively controlled. As an example, by controlling differences in such indexes of refraction at a selected interface disposed between the semiconductor devices to the workpiece 26, reflection at that interface may be reduced or increased so as to enhance the transmission of radiant output at that interface for ultimate delivery to the workpiece 26. For example, the coupling optics may include a dichroic reflector where certain wavelengths of incident light are absorbed, while others are reflected and focused to the surface of workpiece 26.

The coupling optics 30 and 31 may be employed for various purposes. Example purposes include, among others, to protect the semiconductor devices 19 and 27, to retain cooling fluid associated with the cooling subsystem 18 and 39, to collect, condense and/or collimate the radiant output 24 and 25, to collect, direct or reject returned radiation 28 and 29, or for other purposes, alone or in combination. As a further example, the photoreactive systems 10 and 11 may employ coupling optics 30 and 31 so as to enhance the effective quality or quantity of the radiant output 24 and 25, particularly as delivered to the workpiece 26. For example, coupling optics may comprise reflectors, which may be compound parabolic reflectors, to substantially collimate or direct UV light irradiated from UV LED array light sources to cylindrical lenses that substantially focus the UV light at the surface of the workpiece 26. Substantially collimating or directing UV light irradiated from UV LED array light sources to cylindrical lenses by the reflectors (e.g. compound parabolic reflectors) may comprise collimating and directing 50-90% of the UV light irradiated from the UV LED array light sources and may depend on the geometry, material, surface coating, or the like, of the reflectors. Furthermore, substantially focusing the UV light at the surface of the workpiece 26 via the cylindrical lenses may comprise focusing 20-90% of the UV light at the surface of the workpiece, and may depend on the size and geometry of the workpiece 26. For example, whereas there may be larger overfill for smaller geometry workpieces such as a fiber, a larger sized workpiece may receive a smaller overfill amount. Further still, there may be some overfill to account for alignment tolerances.

In this manner, the reflectors may substantially reduce the emitting angle of light from the UV light sources, thereby directing the light substantially through the cylindrical lenses, the cylindrical lenses focusing the light intensely along a surface of the workpiece 26.

Selected of the plurality of semiconductor devices 19 and 27 may be coupled to the controllers 14 and 15 via coupling electronics 22 and 23, so as to provide data to the controllers 14 and 15. As described further below, the controller may also be implemented to control such data-providing semiconductor devices, e.g., via the coupling electronics 22 and 23. The controller 14 and 15 may be connected to, and may be implemented to control, each of the power sources 16 and 17, and the cooling subsystems 18 and 39. Moreover, the controllers 14 and 15 may receive data from power sources 16 and 17 and cooling subsystems 18 and 39. In a further example, controllers 14 and 15 may communicate with each other (not shown in FIG. 1) to control operation of photoreactive systems 10 and 11. For example, controllers 14 and 15 may operate in a master-slave cascading control algorithm, where the setpoint of one of the controllers is set by the output of the other controller. Other control strategies for operation of photoreactive system 10 in conjunction with photoreactive system 11 may also be used.

In addition to the power sources 16 and 17, cooling subsystems 18 and 39, and light emitting subsystems 12 and 13, the controllers 14 and 15 may also be connected to, and implemented to control internal elements 32 and 33, and external elements 34 and 35. Elements 32 and 33, as shown, may be internal to the photoreactive systems 10 and 11. Elements 34 and 35, as shown, may be external to the photoreactive systems 10 and 11, but may be associated with the workpiece 26 (e.g., handling, cooling or other external equipment) or may be otherwise related to the photoreaction that photoreactive systems 10 and 11 support.

The data received by the controllers 14 and 15 from one or more of the power sources 16 and 17, the cooling subsystems 18 and 39, the light emitting subsystems 12 and 13, and/or elements 32 and 33, and 34 and 35, may be of various types. As an example the data may be representative of one or more characteristics associated with coupled semiconductor devices 19 and 27, respectively. As another example, the data may be representative of one or more characteristics associated with the respective light emitting subsystems 12 and 13, power sources 16 and 17, cooling subsystems 18 and 39, internal elements 32 and 33, and external elements 34 and 35 providing the data. As still another example, the data may be representative of one or more characteristics associated with the workpiece 26 (e.g., representative of the radiant output energy or spectral component(s) directed to the workpiece). Moreover, the data may be representative of some combination of these characteristics.

The controllers 14 and 15, in receipt of any such data, may be implemented to respond to that data. For example, responsive to such data from any such component, the controllers 14 and 15 may be implemented to control one or more of the power sources 16 and 17, cooling subsystems 18 and 39, light emitting subsystems 12 and 13 (including one or more such coupled semiconductor devices), and/or the elements 32, 33, 34, and 35. As an example, responsive to data from the light emitting subsystem indicating that the light energy is insufficient at one or more points associated with the workpiece, the controller 14 may be implemented to either (a) increase the power source's supply of power to one or more of the semiconductor devices, (b) increase cooling of the light emitting subsystem via the cooling subsystem 18 (e.g., certain light emitting devices, if cooled, provide greater radiant output), (c) increase the time during which the power is supplied to such devices, or (d) a combination of the above. As a further example, controllers 14 and 15 may be implemented to control light emitting subsystem 12 and/or photoreactive system 10 independently from light emitting subsystem 13 and/or photoreactive system 11.

Individual semiconductor devices 19 and 27 (e.g., LED devices) of the light emitting subsystems 12 and 13 may be controlled independently by controllers 14 and 15. For example, controllers 14 and 15 may control a first group of one or more individual LED devices to emit light of a first intensity, wavelength, and the like, while controlling a second group of one or more individual LED devices to emit light of a different intensity, wavelength, and the like. The first group of one or more individual LED devices may be within the same array of semiconductor devices 20 and 21, or may be from more than one array of semiconductor devices 20 and 21. Arrays of semiconductor devices 20 and 21 may also be controlled independently by controllers 14 and 15 from other arrays of semiconductor devices 20 and 21 in light emitting subsystems 12 and 13 by controllers 14 and 15 respectively. For example, the semiconductor devices of a first array may be controlled to emit light of a first intensity, wavelength, and the like, while those of a second array may be controlled to emit light of a second intensity, wavelength, and the like.

As a further example, under a first set of conditions (e.g. for a specific workpiece, photoreaction, and/or set of operating conditions) controllers 14 and 15 may operate photoreactive systems 10 and 11 to implement a first control strategy, whereas under a second set of conditions (e.g. for a specific workpiece, photoreaction, and/or set of operating conditions) controllers 14 and 15 may operate photoreactive systems 10 and 11 to implement a second control strategy. As described above, the first control strategy may include operating a first group of one or more individual semiconductor devices (e.g., LED devices) to emit light of a first intensity, wavelength, and the like, while the second control strategy may include operating a second group of one or more individual LED devices to emit light of a second intensity, wavelength, and the like. The first group of LED devices may be the same group of LED devices as the second group, and may span one or more arrays of LED devices, or may be a different group of LED devices from the second group, but the different group of LED devices may include a subset of one or more LED devices from the second group.

The cooling subsystems 18 and 39 may be implemented to manage the thermal behavior of the light emitting subsystems 12 and 13. For example, the cooling subsystems 18 and 39 may provide for cooling of light emitting subsystems 12 and 13, and more specifically, the semiconductor devices 19 and 27. The cooling subsystems 18 and 39 may also be implemented to cool the workpiece 26 and/or the space between the workpiece 26 and the photoreactive systems 10 and 11 (e.g., the light emitting subsystems 12 and 13). For example, cooling subsystems 18 and 39 may be an air or other fluid (e.g., water) cooling system. Cooling subsystem may also include cooling elements such as cooling fins attached to the semiconductor devices 19 and 27, or arrays 20 and 21 thereof, or to the coupling optics 30 and 31. For example, cooling subsystem may include blowing cooling air over the LED reflectors (e.g., coupling optics 30 and 31), wherein the reflectors are equipped with external fins to enhance heat transfer.

The photoreactive systems 10 and 11 may be used for various applications. Examples include, without limitation, curing applications ranging from ink printing to the fabrication of DVDs and lithography. The applications in which the photoreactive systems 10 and 11 may be employed can have associated operating parameters. That is, an application may have associated operating parameters as follows: provision of one or more levels of radiant power, at one or more wavelengths, applied over one or more periods of time. In order to properly accomplish the photoreaction associated with the application, optical power may be delivered at or near the workpiece 26 at or above one or more predetermined levels of one or a plurality of these parameters (and/or for a certain time, times or range of times).

In order to follow an intended application's parameters, the semiconductor devices 19 and 27 providing radiant output 24 and 25 may be operated in accordance with various characteristics associated with the application's parameters, e.g., temperature, spectral distribution and radiant power. At the same time, the semiconductor devices 19 and 27 may have certain operating specifications, which may be associated with the semiconductor devices' fabrication and, among other things, may be followed in order to preclude destruction and/or forestall degradation of the devices. Other components of the photoreactive systems 10 and 11 may also have associated operating specifications. These specifications may include ranges (e.g., maximum and minimum) for operating temperatures and applied electrical power, among other parameter specifications.

Accordingly, the photoreactive systems 10 and 11 may support monitoring of the application's parameters. In addition, the photoreactive systems 10 and 11 may provide for monitoring of semiconductor devices 19 and 27, including their respective characteristics and specifications. Moreover, the photoreactive systems 10 and 11 may also provide for monitoring of selected other components of the photoreactive systems 10 and 11, including their characteristics and specifications.

Providing such monitoring may enable verification of the system's proper operation so that operation of photoreactive systems 10 and 11 may be reliably evaluated. For example, photoreactive systems 10 and 11 may be operating improperly with respect to one or more of the application's parameters (e.g. temperature, spectral distribution, radiant power, and the like), any component's characteristics associated with such parameters and/or any component's respective operating specifications. The provision of monitoring may be responsive and carried out in accordance with the data received by the controllers 14 and 15 from one or more of the system's components.

Monitoring may also support control of the system's operation. For example, a control strategy may be implemented via the controllers 14 and 15, the controllers 14 and 15 receiving and being responsive to data from one or more system components. This control strategy, as described above, may be implemented directly (e.g., by controlling a component through control signals directed to the component, based on data respecting that components operation) or indirectly (e.g., by controlling a component's operation through control signals directed to adjust operation of other components). As an example, a semiconductor device's radiant output may be adjusted indirectly through control signals directed to the power sources 16 and 17 that adjust power applied to the light emitting subsystems 12 and 13 and/or through control signals directed to the cooling subsystems 18 and 39 that adjust cooling applied to the light emitting subsystems 12 and 13.

Control strategies may be employed to enable and/or enhance the system's proper operation and/or performance of the application. In a more specific example, control may also be employed to enable and/or enhance balance between the array's radiant output and its operating temperature, so as, e.g., to preclude heating the semiconductor devices 19 and 27 or array of semiconductor devices 20 and 21 beyond their specifications while also directing radiant energy to the workpiece 26 sufficient to properly complete the photoreaction(s) of the application.

In some applications, high radiant power may be delivered to the workpiece 26. Accordingly, the light emitting subsystems 12 and 13 may be implemented using arrays of light emitting semiconductor devices 20 and 21. For example, the light emitting subsystems 12 and 13 may be implemented using a high-density, light emitting diode (LED) array. Although LED arrays may be used and are described in detail herein, it is understood that the semiconductor devices 19 and 27, and arrays 20 and 21 of same, may be implemented using other light emitting technologies without departing from the principles of the photoreactive system; examples of other light emitting technologies include, without limitation, organic LEDs, laser diodes, other semiconductor lasers.

Continuing with FIG. 1, the plurality of semiconductor devices 19 and 27 may be provided in the form of arrays 20 and 21, or an array of arrays (e.g., as shown in FIG. 1). The arrays 20 and 21 may be implemented so that one or more, or most of the semiconductor devices 19 and 27 are configured to provide radiant output. At the same time, however, one or more of the array's semiconductor devices 19 and 27 may be implemented so as to provide for monitoring selected of the array's characteristics. The monitoring devices 36 and 37 may be selected from among the devices in the array and, for example, may have the same structure as the other, emitting devices. For example, the difference between emitting and monitoring may be determined by the coupling electronics 22 and 23 associated with the particular semiconductor device (e.g., in a basic form, an LED array may have monitoring LED devices where the coupling electronics provides a reverse current, and emitting LED devices where the coupling electronics provides a forward current).

Furthermore, based on coupling electronics, selected of the semiconductor devices in the array may be either/both multifunction devices and/or multimode devices, where (a) multifunction devices may be capable of detecting more than one characteristic (e.g., either radiant output, temperature, magnetic fields, vibration, pressure, acceleration, and other mechanical forces or deformations) and may be switched among these detection functions in accordance with the application parameters or other determinative factors and (b) multimode devices may be capable of emission, detection and some other mode (e.g., off) and may be switched among modes in accordance with the application parameters or other determinative factors.

As described above, photoreactive systems 10 and 11 may be configured to receive a workpiece 26. As an example, workpiece 26 may be a UV-curable optical fiber, ribbon, or cable. Furthermore, workpiece 26 may be positioned at or near the foci of coupling optics 30 and 31 of photoreactive systems 10 and 11 respectively. In this manner, UV light irradiated from photoreactive systems 10 and 11 may be directed via coupling optics to the surface of the workpiece for UV curing and driving the photoreactions thereat. Further still, coupling optics 30 and 31 of photoreactive systems 10 and 11 may be equally spaced around a central axis of workpiece 26 so that UV light may be substantially focused by the coupling optics 30 and 31 at the surface of workpiece 26.

Turning now to FIG. 2, it illustrates a cross-section of an example of a conventional LED array light source 200 that emits light in a large cone angle. The LED array light source 200 may comprise a housing 210. Light rays 260 are emitted from the light source over a wide cone angle. As an example the light emitted from conventional LED arrays conform approximately to a Lambertian distribution. In FIG. 3, the broad radiance spectrum of a Lambertian distribution is shown in the plot 300, wherein radiance output is distinguishable over a broad cone angle.

Turning now to FIG. 4, it illustrates a cross-section of an example of an LED array light source 400 with a reflector, for example, a compound parabolic reflector 440. Compound parabolic reflector 440 is attached to a housing 410 of light source 400 that contains the light sources and includes inlets and outlets for a cooling subsystem fluid, wherein the light source emits light approximately from the focus of the compound parabola.

A parabola is a conic section, created from the intersection of a right circular conical surface and a plane parallel to a generating straight line of that surface. A parabola can also be defined as the locus of points in a plane that are equidistant from both a line (the directrix) and a point (the focus). The line perpendicular to the directrix and passing through the focus, bisecting the parabola, is its axis of symmetry. The point on the axis of symmetry that intersects the parabola is the vertex, and it is the point on the parabola where the curvature is greatest. A compound parabola may be derived from the overlapping regions of two parabolas having a common focus, but different vertices.

A parabolic reflector may be a reflective device used to collect or project energy such as light. The shape of a parabolic reflector may be that of a cylindrical parabola, the surface generated by projecting a parabola along an axis perpendicular to the plane of the parabola. A parabolic reflector may reflect light rays generated from a linear light source placed at the parabolic axial focus into a collimated beam parallel to the parabola axis. A compound parabolic reflector may also be a reflective device used to collect or project light. The shape of a compound parabolic reflector may derive from projecting a compound parabola along an axis perpendicular to the plane of the parabola. A compound parabolic reflector may reflect light rays generated from an approximately linear light source positioned along its axial focus into a substantially collimated beam, as shown by the path of the light rays emitted from housing 410 of light source 400 in FIG. 4. Thus, compound parabolic reflector 440 may be configured to substantially reduce the emitting angle of light from light source 400. Compound parabolic optics are known in field of optics and physics, and are not described here in further detail. In the configuration of FIG. 4, because the light rays are emitted near and along an axial focus of the compound parabolic reflector, the compound parabolic reflector 440 substantially collimates and directs light rays 460, thereby substantially reducing the emitting angle, as shown in FIG. 4. For UV curing, the interior surface of the parabolic reflector may be UV-reflective, to direct UV light substantially onto the surface of a workpiece 26.

Turning now to FIG. 5, it illustrates a plot of an example radiance spectrum of light emitted from a parabolic reflector. Comparing the spectra of FIG. 3 with FIG. 5 shows that the emitting angle for an LED array light source may be substantially reduced by using a parabolic reflector. Specifically, the radiance spectra of a light source with a parabolic reflector is output over a much narrower cone angle.

Turning now to FIG. 6, it illustrates an example of a cylindrical lens 600. A cylindrical lens is a lens that focuses light passing through the lens on to a line, rather than on to a point as a spherical lens would. The curved face or faces of a cylindrical lens are sections of a cylinder, and focus the light rays passing through it onto a line parallel to the intersection of the surface of the lens and a plane tangent to it. The lens compresses the image in the direction perpendicular to this line, and leaves it unaltered in the direction parallel to it (in the tangent plane). As an example the cylindrical lens may be a cylindrical Fresnel lens, as shown in FIG. 6. Other suitable types of cylindrical lenses may also be used such as plano-convex or plano-concave, double-convex, meniscus, and coated cylindrical lenses.

Turning now to FIG. 7, it illustrates an example of a light emitting subsystem 700, including light source 710, compound parabolic reflector 740, cylindrical lens 770. As shown in FIG. 7, the housing of light source 710 is mechanically coupled to the compound parabolic reflector 740 such that light emitted from light source 710 originates near the focus of the parabolic reflector. As such light rays 760 emitted from light source 710 are reflected and substantially directed to lens cylindrical 770, whereby they are subsequently substantially focused onto the surface of workpiece 780. Light emitting subsystem 700 may be aligned with respect to workpiece 780 such that light emitted from light source 710 and substantially reflected by a reflector, which may be a compound parabolic reflector 740, may be substantially focused upon passing through cylindrical lens 770 onto the surface of workpiece 780. The shape of compound parabolic reflector 740 may depart slightly from a perfectly compound parabolic without substantially compromising the substantial reflection of light irradiated by light source 710 to the cylindrical lenses. As a further example, the shape of compound parabolic reflector 740 departing slightly from perfectly compound parabolic can include faceted compound parabolic surfaces, wherein the general shape of the reflectors may be compound parabolic, but with individual sections faceted to slightly depart from a compound parabolic. Faceted or partially faceted compound parabolic surfaces may potentially allow for control of reflected light in a manner that enhances light uniformity or intensity at the workpiece surface for a given light source. Each of the facets may be flat, with corners connecting a plurality of the flat facets to form the parabolic surface. Alternatively, the facets may have a curved surface. Cylindrical lens 770 may also comprise a cylindrical Fresnel lens.

Turning now to FIG. 8, it illustrates a UV curing device 800 configured with three photoreactive systems 802. Each photoreactive system 802 may comprise a light emitting subsystem comprising a light source 810 (e.g. a UV LED array), a compound parabolic reflector 860, and a cylindrical lens 870. As shown in the device of FIG. 7, for each photoreactive system 802, the light source 810 may be mechanically coupled to the compound parabolic reflector 860 such that light emitted from the light source 810 originates near the focus of the compound parabolic reflector 860. As such light is substantially reflected and directed to the cylindrical lens 870. The cylindrical lens 870 may be mounted on an opposite end of the compound parabolic reflector 860 from the light source 810 as shown, whereby light reflected by the compound parabolic reflector 860 is directed substantially to the cylindrical lens 870, whereby it is substantially focused at the surface of a workpiece 820. Photoreactive systems 802 may be equally spaced around a central axis of workpiece 820 as shown in FIG. 8, whereby the cylindrical lenses 870 may substantially focus UV light at or near the surface of the workpiece 820.

Furthermore at least two photoreactive systems 802, each including compound parabolic reflectors 860 and cylindrical lenses 870, may be positioned so that light is substantially focused at or in the vicinity or encompassing the workpiece surfaces, on opposing sides of the workpiece 820.

Because at least two light sources 810 may be used in conjunction with compound parabolic reflectors 860, and are equally spaced around the axis of the workpiece 820, the surfaces of the workpiece 820 that are far-field relative to one light source 810, may be near-field relative to another light source 810. As such the design of the UV curing device 800, with a plurality of light sources 810 equally spaced round the axis of the workpiece 820, can potentially avoid using back reflectors, simplifying system design and cost. In this manner, the configuration exemplified in FIG. 8 can also potentially achieve higher irradiance and more uniform irradiance across the workpiece surfaces relative to conventional UV curing devices employing a single light source. Achieving higher and more uniform irradiance may potentially allow for increased production rates and/or shorter curing times, thereby reducing product manufacturing costs.

A further potential advantage of using a plurality of light sources relative to UV curing devices employing single light sources is that UV light from a plurality of light sources can be concentrated more uniformly across all surfaces of the workpiece, while maintaining high irradiance as compared to conventional single light source UV curing devices. Furthermore because multiple light sources are used, light irradiated from the light sources can substantially be directed to the surface of the workpiece, even when there may be slight misalignment of the workpiece from the focus of the cylindrical lenses, or slight misalignment of one or more light sources, compound parabolic reflectors, or cylindrical lenses. Furthermore, in cases where the cross section of the workpiece may be irregularly shaped or asymmetrical, or in cases where the workpiece cross section may be large, light irradiated from the light sources can be substantially directed to the surface of the workpiece, when multiple light sources are used in conjunction.

Use of at least two light sources also imparts more flexibility in controlling the irradiance and spectral wavelengths of the irradiated light. For example the irradiance and bulb types of the two or more light sources can be varied independently, or they can be matched. Use of multiple light sources can also provide some fail-safe redundancy, in case of failure or malfunction of one of the light sources during operation.

The light sources may further comprise, for example, individual LED devices, arrays of LED devices, or arrays of LED arrays. In this arrangement, the compound parabolic surfaces can substantially concentrate light irradiated from light sources positioned at, or in the vicinity, of the compound parabolic reflector foci onto the surfaces of the workpiece 820.

A sample tube 850 may concentrically surround and be configured to receive a workpiece 820. Sample tube 850 may be substantially centered around the axis of workpiece 820, and may be filled or purged with an inert gas such as nitrogen, carbon dioxide, helium, or another inert gas so as to reduce oxygen inhibition of the UV curing reaction. The sample tube 850 may be constructed of glass, quartz, or other material that does not substantially absorb, refract, reflect, or otherwise interfere with the UV light transmitted through the sample tube 850 via the cylindrical lenses 870 and compound parabolic reflectors 860. Workpiece 820 may be continuously drawn through the sample tube, at a draw rate such that the entire length of the workpiece can be exposed to UV light at a sufficient irradiance from the light sources 810 to be UV-cured.

Compound parabolic reflectors 860 can comprise reflective interior surfaces for reflecting and directing light rays emanating from light sources 810. The reflective interior surfaces may reflect visible and/or UV and/or IR light rays with minimal absorption or refraction of light. Compound parabolic reflectors 860 may comprise hollow reflectors or solid optics using total internal reflection. Alternately, the compound parabolic reflectors 860 may comprise reflective interior surfaces that may be dichroic such that a certain range of wavelengths of light may be reflected, whereas light of wavelengths outside a certain range may be absorbed at the reflective interior surfaces. For example, the reflective interior surfaces may be designed to reflect UV and visible light rays, but absorb IR light rays. Such a reflective interior surface may be potentially useful for heat sensitive coatings or workpieces, or to moderate the rate and uniformity of the curing reaction at the surface of workpiece 820. On the other hand, the reflective interior surfaces may preferentially reflect both UV and IR since curing reactions can proceed more rapidly at higher temperatures.

Workpiece 820 can include optical fibers, ribbons or cables having a range of sizes and dimensions. Workpiece 820 may also include a UV-curable cladding and/or surface coating, as well as UV-curable ink printed on its surface. UV-curable cladding can include one or more UV-curable polymer systems, and may also include more than one UV-curable layer, that may be UV-curable in one or more curing stages. UV-curable surface coatings may include a thin film, or an ink that is curable on the surface of the optical fiber or optical fiber cladding. For example, the workpiece 820 may be an optical fiber comprising a core and cladding layer, and the cladding may include a coating comprising a UV-curable polymer such as a polyimide or acrylate polymer, or another one or more UV-curable polymers. As another example, a dual-layer coating may also be used, wherein the workpiece may be coated with an inner layer that may have a soft and rubbery quality when cured for minimizing attenuation by microbending, and an outer layer, which may be stiffer and suited for protecting the workpiece (e.g. optical fiber) from abrasion and exposure to the environment (e.g., moisture, UV). The inner and outer layers may comprise a polymer system, for example an epoxy system, comprising initiators, monomers, oligomers, and other additives.

During curing, the workpiece 820 may be pulled or drawn through the UV curing device in the axial direction, inside the sample tube 850, wherein the workpiece 820 is substantially axially centered relative to the two or more photoreactive systems 802. Furthermore, the sample tube 850 may be axially centered about the foci of the cylindrical lenses 870, and may concentrically surround the workpiece 820. Sample tube 850 may be constructed of glass, or quartz or another optically and/or UV and/or IR transparent material, and may not be overly thick in dimension, such that the sample tube 850 does not block or substantially interfere with the light rays irradiated from light sources 810 and directed from the compound parabolic reflectors 860 through the sample tube 850 onto the surfaces of workpiece 820. Sample tube 850 may have a circular cross-section, as shown in FIG. 8, or may possess another suitably shaped cross-section. Sample tube 850 may also contain an inerting gas such as nitrogen, carbon dioxide, helium, and the like, in order to sustain an inert atmosphere around the workpiece and to reduce oxygen inhibition, which may slow the UV curing reaction.

Light sources 810 may include one or more of semiconductor devices or arrays of semiconductor devices such as LED light sources, LED array light sources, or microwave-powered, or halogen arc light sources, or arrays thereof. Furthermore, light sources 810 may extend along the axial length of the compound parabolic reflector 860 and cylindrical lens 870. Light sources 810, particularly arrays of light sources, or arrays of arrays of light sources, may further encompass or extend beyond the foci of the compound parabolic reflectors 860 along or at points along the length of the compound parabolic reflector portions of UV curing device 800. In this manner, light irradiated from light sources 810 along the axial length of the compound parabolic reflectors is substantially redirected to the surface of workpiece 820 along its entire axial length.

Furthermore, light sources 810 may emit one or more of visible, UV, or IR light. Further still, light sources 810 may be identical or different types of light sources. For example, one of light sources 810 may irradiate UV light and another of light sources 810 may irradiate IR light. As another example, one of light sources 80 may irradiate UV light of a first spectrum, while another of light sources 820 may irradiate UV light of a second spectrum. The first and second spectrums emitted by one and another of light sources 810 may or may not overlap. For example, if one of the light sources 810 is a first type of LED light source and another of the light sources 810 is a second type of LED light source, then their emission spectra may or may not overlap. Furthermore, the intensities of light irradiated by light sources 810 may be identical or they may be different, and their intensities can be independently controlled by an operator via a controller (e.g. 14, 15) or coupling (e.g., 22, 23) electronics. In this manner, both the light intensity and wavelengths of light sources 810 can be flexibly and independently controlled for achieving uniform UV irradiation and UV cure of a workpiece. For instance, if a workpiece is irregularly shaped, and/or is not symmetrical about the focus of the cylindrical lenses 870, the UV curing device may irradiate one portion of the workpiece differentially from another portion to achieve uniform cure. As another example if different coatings or inks are applied to the surface of the workpiece, the UV curing device may irradiate one portion of the workpiece differentially from another portion.

In a UV curing device with compound parabolic reflectors 860 and at least two light sources 810 each positioned at a focus of the compound parabolic reflectors 860, a workpiece positioned at the focus of cylindrical lenses 870 may be irradiated with UV light more uniformly and at higher intensities, as compared to conventional UV curing devices employing one reflector and a single light source. In this manner, UV curing a workpiece using at least two photoreactive systems 802 equally spaced about an axis of the workpiece 820 may achieve faster curing rates and more uniform cure of the workpiece 820. In other words, faster curing rates can be achieved while achieving more uniform cure. Non-uniform or unevenly coated workpieces may potentially experience non-uniform forces when the coating expands or contracts. For the case of an optical fiber, non-uniformly coated optical fibers can be more susceptible to greater signal attenuation. Achieving more uniform cure may include higher percent conversion of reactive monomer and oligomer, and higher degree of cross-linking in the polymer system, in addition to achieving concentric coatings around the workpiece (e.g., an optical fiber) that have constant thickness and are continuous over the application length of the workpiece (e.g., an optical fiber).

Achieving faster curing rates in a continuous or batch manufacturing process of optical fibers, cables, ribbons, or the like, may potentially reduce the manufacturing time and costs. Furthermore, achieving more uniform cure may potentially impart higher durability and strength to the workpiece. In the case of an optical fiber coating, increased coating uniformity may potentially preserve the fiber strength, thereby potentially increasing the durability of the optical fiber with respect to preventing attenuation of signal transmission due to phenomena such as microbending deformations, stress corrosion, or other mechanical damage in the optical fiber. Higher degrees of cross-linking may also potentially increase the chemical resistance of the coating, preventing chemical penetration and chemical corrosion or damage of the optical fiber. Optical fibers may be severely degraded by surface defects. With conventional UV curing devices, especially those employing one light source, faster curing rates can be achieved, but at the expense of reduced cure uniformity; similarly, more uniform cure can be achieved, but at the expense of lowering curing rates.

As such, a UV curing device may comprise at least two UV light sources equally spaced around a central axis, each UV light source comprising a reflector and a cylindrical lens, and the UV curing device configured to receive a workpiece along the central axis. The reflectors may be configured to substantially reduce the emitting angle of light from the UV light sources, thereby directing the light substantially through the cylindrical lenses, the cylindrical lenses focusing the light intensely along a surface of the workpiece. Furthermore, the reflectors may attach to housings for the UV light sources, wherein the UV light sources may comprise a power source, a controller, a cooling subsystem, and a light emitting subsystem, wherein the light emitting subsystem may include coupling electronics, coupling optics and a plurality of semiconductor devices, and wherein the housings may contain the light sources and may include inlets and outlets for cooling subsystem fluid. The plurality of semiconductor devices of the UV light sources may comprise UV LED arrays, wherein UV light originating from the semiconductor devices may be substantially directed and focused along the surface of the workpiece via the reflectors and cylindrical lenses. The cylindrical lenses may comprise cylindrical Fresnel lenses, and the reflectors may comprise compound parabolic reflectors. The compound parabolic reflectors may comprise hollow reflectors, solid optics using total internal reflection, or dichroic reflectors. The at least two UV light sources may emit UV light with different peak wavelengths. The cooling subsystem may comprise a circulating cooling fluid for dissipating heat from the UV curing device and cooling fins mounted on an external surface of the reflectors.

Various processes or methods may be used to manufacture the compound parabolic reflectors 860, depending on application parameters such as heat load, precision, cost, and the like. The compound parabolic reflectors 860 may be machined or cast from metal, or machined or molded from glass, ceramic, and/or plastic formed and combined with a high reflectance coating. Furthermore, the compound parabolic reflectors 860 may include external surfaces that are designed for heat transfer cooling of the UV curing system. For example, the external surfaces may be ridged to increase heat transfer, and may also include cooling fins or other structures for dissipating heat attached to the external surfaces of compound parabolic reflectors 860. Additional cooling elements as part of a cooling subsystem 18 (not shown in FIG. 8) may also be provided by convection of cooling air or other inert fluids over one or more surfaces of the compound parabolic reflectors 860.

UV curing device 800 may also comprise other components not shown in FIG. 8 such as a power supply. Furthermore, light sources 810 may be attached to the compound parabolic reflectors 860 via the housings for the light sources 810. For example, the housings may be mechanically fastened to the compound parabolic reflectors 860 via a faceplate or other mechanical means. Furthermore, the housings may contain the light sources 810 and include inlets and outlets for cooling subsystem fluid.

Thus, a photoreactive system for UV curing may include a power supply, a cooling subsystem, and a light emitting subsystem. The light emitting subsystem may comprise at least two UV LED array light sources, wherein each UV LED array light source is arranged equally spaced about a central axis, the UV curing device configured to receive a workpiece along the central axis, and coupling optics for each UV LED array light source, including compound parabolic reflectors and cylindrical lenses. The compound parabolic reflectors may be configured to substantially direct UV light emitted from the UV LED array light sources to the cylindrical lenses, and the cylindrical lenses may be configured to focus the UV light onto a surface of a workpiece. The photoreactive system for UV curing may further comprise a controller, including instructions executable to irradiate UV light from the at least two UV LED array light sources. The coupling optics may further comprise a quartz tube surrounding the workpiece that may be axially centered about the focus of the cylindrical lens, wherein the quartz tube is purged with an inert gas. The cooling subsystem may comprise cooling fins attached to an external surface of the compound parabolic reflectors.

Turning now to FIG. 9, it illustrates a method 900 of curing a workpiece, for example an optical fiber, optical fiber coating, or another type of workpiece. Method 900 begins at step 910, which can include first drawing the optical fiber from a preform in a fiber drawing step. Method 900 then continues at step 920 where the fiber is coated with a UV-curable coating or polymer system using a predetermined coating process.

Next, method 900 proceeds with step 930, wherein the coated optical fiber may be UV-cured. During the UV curing step 930, the optical fiber may be pulled through the sample tube of one or a plurality UV curing devices such as UV curing device 800 arranged linearly in series, during which UV light is irradiated from the LED array light sources 810 of the UV curing devices and directed by the compound parabolic reflectors 860 and cylindrical lenses 870 onto the surface of the optical fiber at or near the focus of the cylindrical lenses 870. The linear speed at which the optical fiber may be pulled can be very fast, and may exceed 20 m/s, for example. Arranging a plurality of UV curing devices 800 in series may thus allow the coated length of optical fiber to receive a long enough UV exposure residence time in order to substantially complete curing of the optical fiber coating. Substantially complete UV curing of the optical fiber coating may impart physical and chemical properties such as strength, durability, chemical resistance, fatigue strength, and the like. Incomplete or inadequate curing may degrade product performance qualities and other properties that can potentially cause premature failure and loss of performance of the optical fiber. In some examples, the effective length of the UV curing stage (for example, the number of UV curing devices 800 arranged in series) is determined by taking into account the manufacturing rate, or draw or linear speed of the optical fiber or workpiece. Thus if the optical fiber linear speed is slower, the length or number of the UV curing system stage may be shorter than for cases where the optical fiber linear speed is faster.

Next, method 900 continues at step 940, where it is determined if additional coating stages are required. In some examples, dual or multi-layer coatings may be applied to the surface of the workpiece, for example an optical fiber. As discussed above, optical fibers can be manufactured to include two protective concentric coating layers. For example, a dual-layer coating may also be used, wherein the workpiece may be coated with an inner layer that may have a soft and rubbery quality when cured for minimizing attenuation by microbending, and an outer layer, which may be stiffer and suited for protecting the workpiece (e.g. optical fiber) from abrasion and exposure to the environment (e.g., moisture, UV). The inner and outer layers may comprise a polymer system comprising initiators, monomers, oligomers, and other additives. If an additional coating step is to be performed, then method 900 returns to step 920 where the optical fiber or other workpiece (now coated with a UV-cured first layer) is coated via an additional coating step 920 followed by an additional UV curing step 930. In FIG. 9, each coating step is shown as the optical fiber coating step 920 for simple illustrative purposes, however, each coating step may not be identical such that each coating step may apply different types of coatings, different coating compositions, different coating thicknesses, and impart different coating properties to the workpiece. In addition the coating process step 920 may use different processing conditions (e.g., temperature, coating viscosity, coating method). Similarly, UV curing of different coating layers or steps can involve variable methods or processing conditions. For example, in different UV cure steps, processing conditions such as UV light intensity, UV exposure time, UV light wavelength spectra, UV light source, and the like may be changed depending on the type of coating and/or coating properties.

Following the one or more coating and curing steps 920 and 930, method 900 may continue at step 950. At step 950, a UV curable ink or lacquer may be printed on the coated optical fiber for example, for coloring or identification purposes. The printing may be carried out using a predetermined printing process, and may involve one or more multiple printing stages or steps. Next, method 900 continues at step 960, where the printed ink or lacquer is UV-cured. Similar to the UV curing step of the one or more optical fiber coatings, the printed ink or lacquer is UV-cured by pulling the optical fiber through the sample tube 850 of one or a plurality of UV curing devices 800 arranged linearly in series, during which UV light is irradiated from the LED array light sources 810 of the UV curing device 800 and directed by the compound parabolic reflectors 860 and cylindrical lenses 870 onto the surface of the optical fiber positioned near or at the focus of cylindrical lenses 870. The linear speed at which the optical fiber may be pulled can be very fast, and may exceed 20 m/s, for example. Arranging a plurality of UV curing devices in series may thus allow the printed ink or lacquer along the length of optical fiber to receive a long enough UV exposure residence time in order to substantially complete curing of the printed ink or lacquer. In some examples, the effective length of the UV curing stage (for example, the number of UV curing devices 800 arranged in series) is determined by taking into account the manufacturing rate, or draw or linear speed of the optical fiber or workpiece. Thus if the optical fiber linear speed is slower, the length or number of the UV curing system stage may be shorter than for cases where the optical fiber linear speed is faster. In particular, using UV curing device 800 including compound parabolic reflectors 860 equally spaced around a central axis of the workpiece, and at least two light sources 810, may potentially provide higher intensity and more uniform UV light irradiated and directed onto the surface of the workpiece, thereby providing both faster and more uniform cure of the workpiece. In this manner, optical fiber coatings and/or inks may be UV-cured at higher production rates, thereby lowering manufacturing costs.

Next, method 900 continues at step 970, where it is determined if additional printing stages are required. For example, it may be desirable to print a first layer of ink or lacquer for identification purposes and then print a second layer of ink or lacquer to protect the first printed layer. If additional printing stages are required, then method 900 returns to step 940 to print and UV-cure the additional printed inks and/or lacquers.

In FIG. 9, each printing step is shown as the optical fiber printing step 950 for simple illustrative purposes, however, each printing step may not be identical such that each printing step may apply different types of inks or lacquers, different ink or lacquer compositions, different ink or lacquer thicknesses, and impart different ink or lacquer properties to the workpiece. In addition the printing process step 920 may use different processing conditions (e.g., temperature, coating viscosity, coating method). Similarly, UV curing of different printed layers or steps can involve variable methods or processing conditions. For example, in different UV cure steps, processing conditions such as UV light intensity, UV exposure time, UV light wavelength spectra, UV light source, and the like may be changed depending on the type of coating and/or coating properties.

If there are no additional printing stages, method 900 continues at step 980 where any post-UV curing process steps are performed. As examples, post-UV curing process steps may include cable or ribbon construction, where a plurality of coated and printed and UV-cured optical fibers are combined into a flat ribbon, or a larger diameter cable composed of multiple fibers or ribbons. Other post-UV curing process steps may include co-extrusion of external cladding or sheathing of cables and ribbons.

In this manner, a method of UV curing a workpiece may comprise irradiating UV light from at least two UV light sources equally spaced around a central axis of the workpiece, reflecting the irradiated UV light via reflectors, wherein the reflectors substantially reduce the emitting angle of the UV light, focusing the reflected UV light via cylindrical lenses substantially on to a surface of the workpiece, and drawing the workpiece substantially along the focus of the cylindrical lenses. Drawing the workpiece along the focus may comprise drawing at least one of an optical fiber, ribbon, or cable with at least one of a UV-curable coating, polymer, or ink, along the focus. Reflecting the irradiated UV light may comprise reflecting the irradiated light using compound parabolic reflectors. Irradiating the UV light may comprise irradiating UV light from at least two UV light sources that emit UV light with different peak wavelengths.

The method may also further comprise dissipating heat from an external surface of the reflectors via external fins, and axially centering a quartz sample tube about the focus of the cylindrical lenses, wherein the quartz sample tube concentrically surrounds the workpiece, and wherein the quartz tube is purged with an inert gas.

It will be appreciated that the configurations disclosed herein are exemplary in nature, and that these specific embodiments are not to be considered in a limiting sense, because numerous variations are possible. For example, the above embodiments can be applied to workpieces other than optical fibers, cables, and ribbons. Furthermore, the UV curing devices and systems described above may be integrated with existing manufacturing equipment and are not designed for a specific light source. As described above, any suitable light engine may be used such as a microwave-powered lamp, LED's, LED arrays, and mercury arc lamps. The subject matter of the present disclosure includes all novel and non-obvious combinations and subcombinations of the various configurations, and other features, functions, and/or properties disclosed herein.

Note that the example process flows described herein can be used with various UV curing devices and UV curing system configurations. The process flows described herein may represent one or more of any number of processing strategies such as continuous, batch, semi-batch, and semi-continuous processing, and the like. As such, various acts, operations, or functions illustrated may be performed in the sequence illustrated, in parallel, or in some cases omitted. Likewise, the order of processing is not necessarily called for to achieve the features and advantages of the example embodiments described herein, but is provided for ease of illustration and description. One or more of the illustrated acts or functions may be repeatedly performed depending on the particular strategy being used. It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and subcombinations of the various systems and configurations, and other features, functions, and/or properties disclosed herein.

The following claims particularly point out certain combinations and subcombinations regarded as novel and non-obvious. These claims may refer to "an" element or "a first" element or the equivalent thereof. Such claims are to be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A lighting system, comprising:
   a plurality of light sources positioned around a central axis, each light source emitting radiant output toward the central axis, each of the plurality of light sources comprising:
      a housing containing a plurality of light-emitting elements,
      a parabolic reflector attached to the housing,
      a cylindrical lens mounted at an opposite end of the parabolic reflector from the housing, and
      a controller, including executable instructions to independently vary the radiant output of at least two of the plurality of light sources,
   wherein a first of the plurality of light sources is controlled to emit radiant output of a first intensity and wavelength while a second of the plurality of light sources is controlled to emit radiant output of a second intensity and wavelength different from the first intensity and wavelength,
   wherein the plurality of light sources comprises a first light source and a second light source, a radiant output spectrum of the first light source having a different peak irradiance than a radiant output spectrum of the second light source,
   wherein the first light source and the second light source are controlled to simultaneously emit radiant output,
   wherein each of the plurality of light sources comprises a power source and a cooling subsystem, and wherein a first controller includes executable instructions to modify the radiant output from one of the plurality of light sources in response to signals received from a second controller for another of the plurality of light sources.

2. The lighting system of claim 1, wherein the radiant output spectrum of the first light source is non-overlapping with the radiant output spectrum of the second light source.

3. The lighting system of claim 2, wherein the executable instructions to independently vary the radiant output of at least two of the plurality of light sources comprise independently varying an exposure time of at least two of the plurality of light sources.

4. The lighting system of claim 3, wherein the executable instructions comprise operating two of the plurality of light sources according to a master-slave cascade control algorithm, wherein a desired setpoint radiant output of one of the plurality of light sources is based on a measured radiant output of another of the plurality of light sources.

5. A method of curing a workpiece, comprising:
positioning a plurality of light sources around a central axis of the workpiece, each light source emitting radiant output toward the central axis, each light source comprising:
a housing containing a plurality of light-emitting elements,
a parabolic reflector attached to the housing,
a cylindrical lens mounted to an opposite end of the parabolic reflector from the housing,
a power source,
a cooling subsystem, and
a controller, wherein each light source comprises a separate controller,
independently varying the radiant output from two of the plurality of light sources, wherein a first of the plurality of light sources emits radiant output of a first intensity while a second of the plurality of light sources emits radiant output of a second intensity different from the first intensity,
reflecting the radiant output from each of the light sources via the parabolic reflector towards the cylindrical lens, and
focusing the reflected radiant output via the cylindrical lens on to a surface of the workpiece positioned at a focus of the cylindrical lens.

6. The method of curing a workpiece of claim 5, wherein the plurality of light sources comprises a first light source and a second light source, the method further comprising:
emitting a first radiant output spectrum via the first light source and emitting a second radiant output spectrum from the second light source, the first radiant output spectrum having a different peak irradiance from the second radiant output spectrum, wherein the first light source and the second light source are controlled to simultaneously emit radiant output.

7. The method of curing a workpiece of claim 6, wherein emitting the first radiant output spectrum via the first light source and emitting the second radiant output spectrum from the second light source comprise the first radiant output spectrum being non-overlapping with the second radiant output spectrum.

8. The method of curing a workpiece of claim 7, wherein at least two of the plurality of light sources each comprise a controller, and
independently varying the radiant output from two of the plurality of light sources comprises independently varying a wavelength of two of the plurality of light sources, wherein a first controller controls the first of the plurality of light sources to emit radiant output of a first wavelength while a second controller controls the second of the plurality of light sources to emit radiant output of a second wavelength different from the first wavelength.

9. The method of curing a workpiece of claim 8, wherein independently varying the radiant output from two of the plurality of light sources comprises independently varying an exposure time of two of the plurality of light sources, and wherein the first controller controls the first of the plurality of light sources to emit radiant output for a first exposure time while the second controller controls the second of the plurality of light sources to emit radiant output for a second exposure time different from the first exposure time.

10. A curing system, comprising:
a power supply,
a cooling subsystem, and
a plurality of light sources positioned around a central axis, each light source emitting radiant output toward the central axis, each light source comprising:
a housing containing a plurality of light-emitting elements,
a parabolic reflector attached to the housing,
a cylindrical lens mounted at an opposite end of the parabolic reflector from the housing, and
a controller, including executable instructions to independently vary the radiant output of two of the plurality of light sources,
wherein a first of the plurality of light sources is controlled to emit radiant output of a first intensity while a second of the plurality of light sources is controlled to emit radiant output of a second intensity different from the first intensity, and
wherein each light source comprises a separate controller.

11. The curing system of claim 10, wherein each of the plurality of light sources comprises a power supply, and the executable instructions to independently vary the radiant output of two of the plurality of light sources comprise independently varying an exposure time of two of the plurality of light sources, wherein the first of the plurality of light sources is controlled to emit radiant output for a first exposure time while the second of the plurality of light sources is controlled to emit radiant output for a second exposure time different from the first exposure time.

12. The curing system of claim 11, wherein each of the plurality of light sources comprises a cooling subsystem, and the executable instructions to independently vary the radiant output of two of the plurality of light sources comprise independently varying a wavelength of two of the plurality of light sources, wherein the first of the plurality of light sources is controlled to emit radiant output for a first wavelength while the second of the plurality of light sources is controlled to emit radiant output of a second wavelength different from the first wavelength.

13. The lighting system of claim 1, wherein the first controller includes executable instructions to modify the radiant output from one of the plurality of light sources in response to signals received from a power source of another of the plurality of light sources.

14. The lighting system of claim 13, wherein the first controller includes executable instructions to modify the radiant output from one of the plurality of light sources in response to signals received from a cooling system of another of the plurality of light sources.

15. The method of curing a workpiece of claim 9, further comprising increasing a power delivered from the power source to one of the plurality of light sources in response to a radiant output of another light source being less than a threshold radiant output.

16. The method of curing a workpiece of claim 15, further comprising increasing cooling of one of the plurality of light sources in response to the radiant output of another light source being less than the threshold radiant output.

17. The method of curing a workpiece of claim 16, further comprising increasing an exposure time of one of the plurality of light sources in response to the radiant output of another light source being less than the threshold radiant output.

* * * * *